Nov. 18, 1941.　　　J. R. PARRISH ET AL　　　2,263,048
SPRING WHEEL
Filed July 3, 1940　　　2 Sheets-Sheet 1
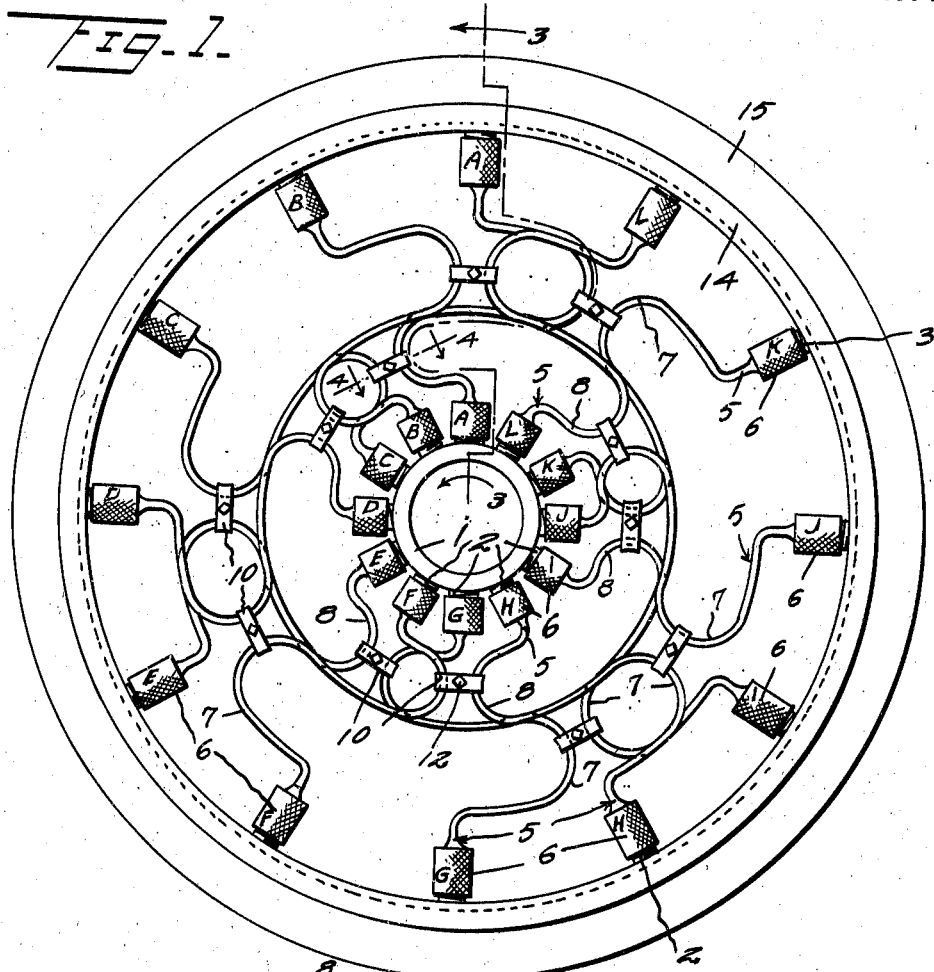
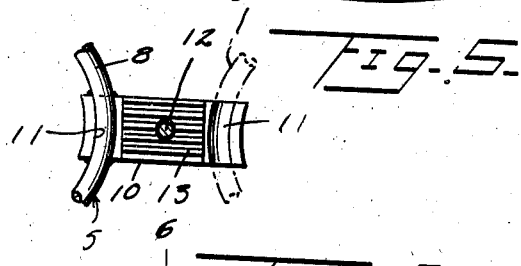
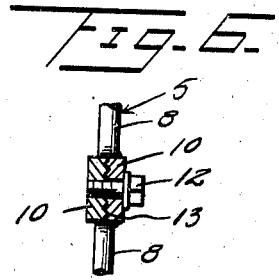
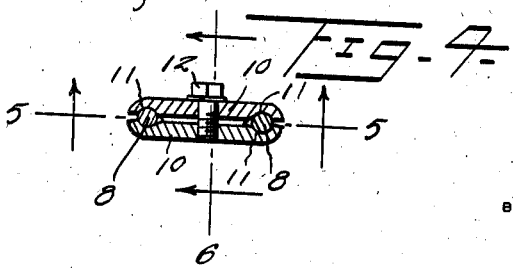
J. R. Parrish
H. A. Behn
INVENTORS
BY Victor J. Evans & Co.
ATTORNEYS Nov. 18, 1941.  J. R. PARRISH ET AL  2,263,048
SPRING WHEEL
Filed July 3, 1940     2 Sheets-Sheet 2
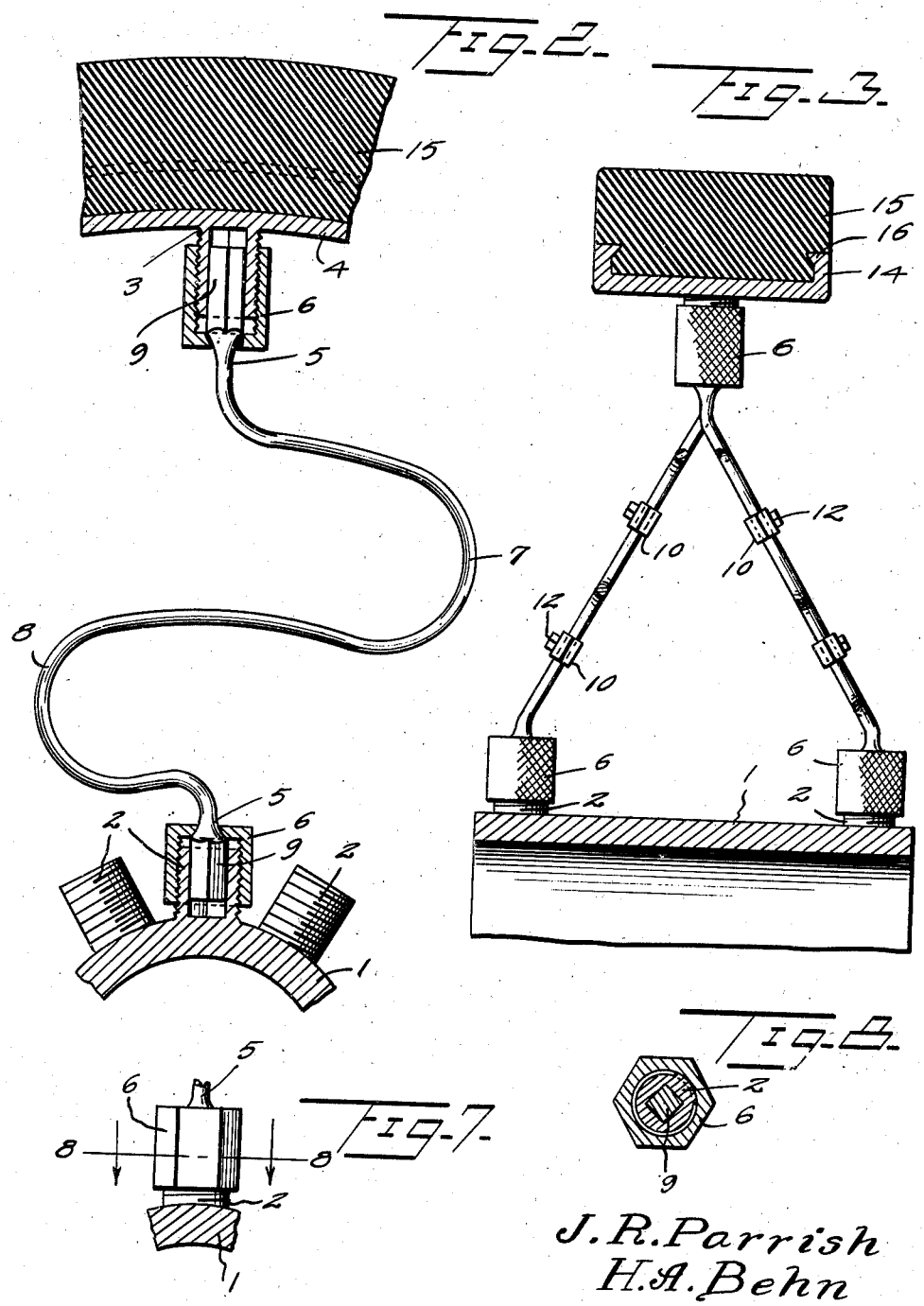
J.R. Parrish
H.A. Behn
INVENTORS
Victor J. Evans & Co.
ATTORNEYS Patented Nov. 18, 1941

2,263,048

UNITED STATES PATENT OFFICE 2,263,048

SPRING WHEEL

Jesse R. Parrish and Herman A. Behn,
West Frankfort, Ill.

Application July 3, 1940, Serial No. 343,870

2 Claims. (Cl. 152—85)

This invention relates to spring wheels, and its general object is to provide a solid rubber tired wheel that is primarily designed for motor vehicles of all types, to take the place of pneumatic tires, but to retain the advantageous features thereof, in that our wheel includes resilient spokes arranged and constructed to provide ample supporting means, as well as to absorb shocks and jars incident to the travel of the wheel over the roadway, with the same or greater efficiency than that of a pneumatic tire, yet eliminates all of the well known disadvantageous features of the latter, such as the high cost of maintenance and accidents brought about by punctures and blow-outs.

A further object is to provide a spring wheel that includes resilient metallic spokes detachably associated with the rim and hub of the wheel, so that they can be easily replaced in the event of breakage or damage, yet casual removal or displacement of the spokes is practically impossible.

Another object is to provide a spring wheel that is simple in construction, inexpensive to manufacture, and extremely efficient in use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the wheel which forms the subject matter of the present invention.

Figure 2 is an enlarged detail sectional view, with parts in elevation and illustrates one of the spokes and the means for attaching the same to the rim and hub.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

Figure 5 is a sectional view taken approximately on line 5—5 of Figure 4, looking in the direction of the arrows.

Figure 6 is a sectional view taken approximately on line 6—6 of Figure 4, looking in the direction of the arrows.

Figure 7 is a detail view partly in section of a slightly modified form of attaching collar.

Figure 8 is a sectional view taken approximately on line 8—8 of Figure 7, looking in the direction of the arrows.

Referring to the drawings in detail, the reference numeral 1 indicates the hub which is of elongated cylindrical formation and formed thereon to project outwardly and radially from adjacent its ends, are hollow exteriorly threaded sleeve thimbles 2 provided with square cornered sockets and arranged in rows so that the thimbles of one row are staggered with respect to those of the other row. The thimbles 2 cooperate with a row of like thimbles 3 formed on and projecting inwardly from the rim 4 for receiving resilient spokes 5 for detachable connection thereof, to the hub and rim, through the instrumentality of cap collars 6 threaded on the thimbles, as clearly shown in Figure 2.

The spokes 5 are each substantially S-shape for the major portion of their length to provide outer looped portions 7 which are preferably of greater length than the inner looped portions 8. In any event, the substantially S-shaped portions which are round in cross section in the form shown, provide the shock absorbing means of the wheel and the ends of the spokes each terminate in enlarged elongated square cornered heads or lugs 9 fitting and mounted within the sockets of companion thimbles 2 and 3 and held accordingly by cap collars 6 that have openings in the closed ends thereof for the passage of the spokes therethrough, the openings being of a diameter to prevent removal of the collars from the spokes but permit slidable movement of the collars thereon, as will be apparent upon inspection of Figure 2, to allow ready removal and application of the spokes with respect to the thimbles, so that they can be replaced in the event of damage or breakage.

While a wheel including twelve spokes is shown in the drawings, it will be obvious that wheels can be constructed to include any number of spokes, and so that the arrangement of the spokes with respect to each other and the rim and hub, will be readily understood, it will be noted that the outer and inner ends thereof are broadly indicated respectively by the letters A to L inclusive.

It will be further noted that while the outer ends of the spokes are arranged in equi-distantly spaced relation with respect to each other, and the same is true with respect to the inner ends, with the exception that the thimbles of the hub are staggered, the outer looped portions 7 are arranged in spaced outer groups of four, and the inner looped portions 8 are likewise arranged in inner groups of the same number, and radially between the outer groups, so that the inner and outer groups are alternately disposed relative to each other, as clearly shown in Figure 1. The looped portions of alternate spokes in each outer group are directed toward each other and connected together and the inner looped portions of alternate spokes in each inner group are connected together. In other words, for example, the spokes lettered B and L of one outer group are connected and spokes A and K are connected, while the spokes A and C of the inner group to the left of the outer group referred to are connected, and the spokes B and D are connected as will be obvious upon inspection of Figure 1 which illustrates that the other spokes are connected accordingly, so that the spokes will have sufficient rigidity to act as supporting means, but of course ample resiliency to absorb shocks and jars.

The means for connecting the looped portions together each include a pair of companion elongated substantially rectangular clamping plates 10 of a length to bridge the adjacent looped portions and the inner faces of the plates 10 are provided with transversely disposed arcuate grooves 11 adjacent to the ends thereof and shaped to fittingly receive the spokes therein, as clearly shown in Figures 4 and 5. The plates are held in clamping engagement with the spokes by screw bolts 12 threaded centrally through the plates and fixed against casual removal by lock washers, as shown in Figure 4. The inner or confronting faces of the clamping plates have ribs 13 formed thereon and extending longitudinally thereof, and the ribs of one plate are seated in recesses between the ribs of its companion plate to prevent any possibility of displacement of the plates relative to each other, so that the spokes will always assume their normal position regardless of the movement thereof out of said position.

Due to the arrangement of the thimbles 2 adjacent the ends of the hub and the thimbles 3 centrally of the outer edges of the rim, the spokes will be inclined in converging relation from the hub, as shown in Figure 3, which likewise illustrates that the cap collars 6 have serrated outer surfaces in the form of that figure to facilitate applying and removing the same with respect to the thimbles. However, the collars may have the outer surfaces thereof square cornered, as shown in Figures 7 and 8 to provide wrench receiving faces.

The rim is formed with annular flanges 14 to provide a channel for receiving a solid rubber tire 15 therein and the flanges have beveled inner edges 16 mounted in lateral annular grooves about the tire, to prevent casual removal or displacement thereof from the rim, as will be apparent upon inspection of Figure 3.

From the above description and the disclosure in the drawings, it will be obvious that our wheel will perform all the functions of pneumatic tire equipment now in general use, yet overcomes all of the difficulties brought about by the use of said equipment as previously indicated.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A spring wheel comprising an elongated cylindrical hub and a rim, hollow exteriorly threaded sleeve like thimbles extending inwardly from the rim and outwardly from the hub adjacent the ends of the latter, resilient spokes being of S-shape for the major portion of their length to provide relatively long outer looped portions and relatively short inner looped portions, said thimbles provided with square cornered sockets, square cornered lugs formed on the ends of the spokes and fittingly mounted within the sockets, cap collars slidably mounted on the spokes and threaded on the thimbles to hold the lugs within the sockets, said spokes being arranged so that the outer looped portions are disposed in groups and the inner looped portions in groups and the inner and outer groups being alternately disposed relative to each other, and means for clamping the looped portions of alternate spokes together in each group.

2. A spring wheel comprising a hub and a rim, resilient spokes shaped to provide looped portions between their ends, means securing the spokes to the hub and rim for disposal between the same, means secured to each of the spokes and connecting the adjacent looped portions of alternate spokes together, each connecting means including a pair of elongated plates having arcuate grooves in the confronting faces thereof to receive the spokes therein, ribs formed on and extending longitudinally of the confronting faces and providing recesses between the ribs, the ribs of one companion plate being mounted in the recesses of the other, and means for securing companion plates together and in clamping engagement with the spokes.

JESSE R. PARRISH.
HERMAN A. BEHN.